June 8, 1954
H. A. TOULMIN, JR
2,680,449
LUBRICATED PLUG VALVE
Filed March 8, 1950
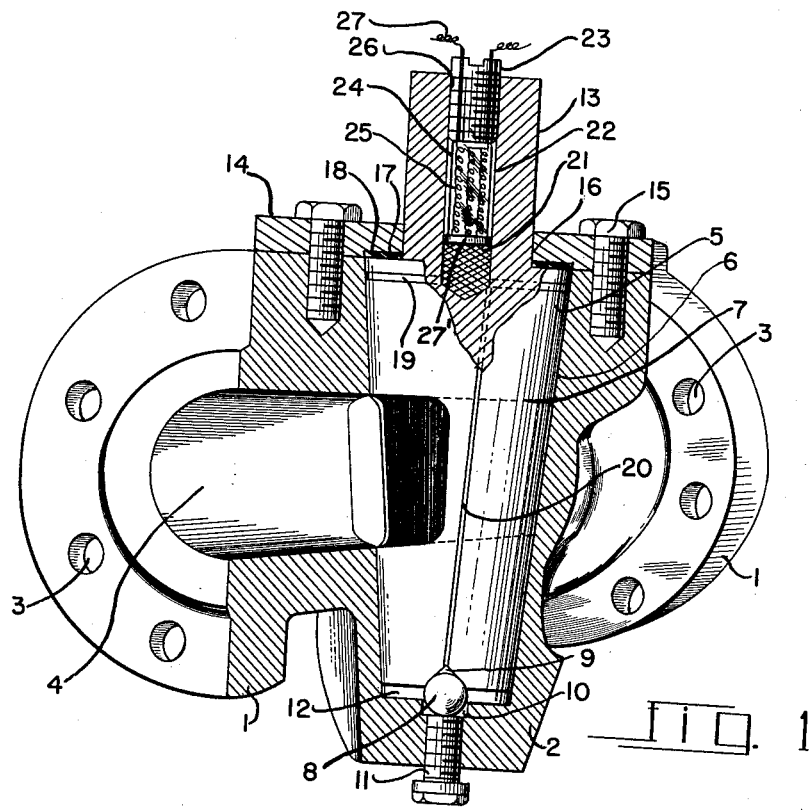
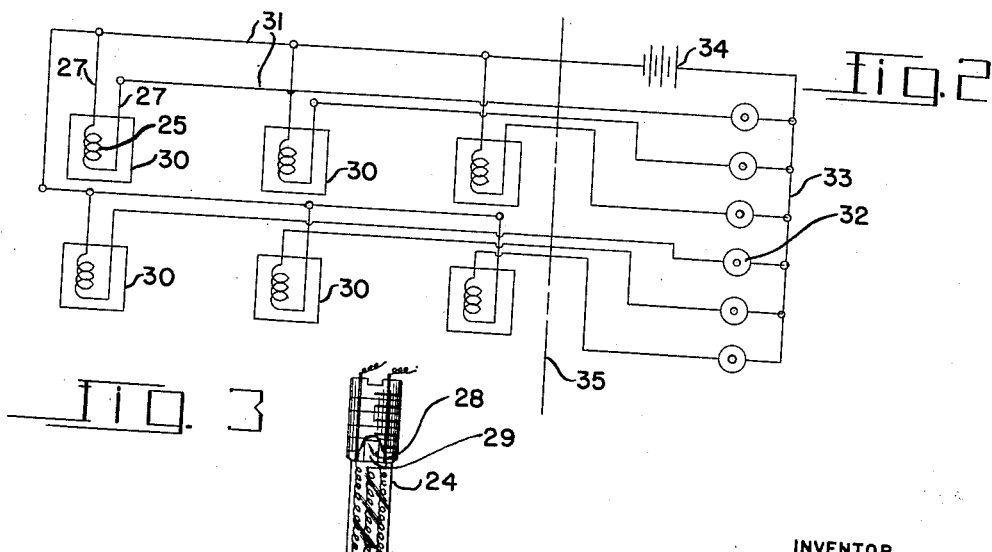
INVENTOR
HARRY A. TOULMIN JR.
BY
Toulmin & Toulmin
ATTORNEYS Patented June 8, 1954

2,680,449

UNITED STATES PATENT OFFICE 2,680,449

LUBRICATED PLUG VALVE

Harry A. Toulmin, Jr., Dayton, Ohio, assignor to The Commonwealth Engineering Company of Ohio, Dayton, Ohio, a corporation of Ohio Application March 8, 1950, Serial No. 148,340

6 Claims. (Cl. 137—246.11)

The present invention relates to cock or plug valves adapted for pipe lines conveying corrosive liquids, which in ordinary cocks tend to rust or seize the plug fast to the valve body, making the operation of the plug very difficult. Various ways of lubricating the contiguous valve surfaces have been heretofore proposed, and many of them employ circumferential and longitudinal grooves along the plug surface, interconnected with a reservoir of oil under pressure. This pressure is usually applied by a screw, manually operated, or by a spring-urged piston located in the reservoir. These arrangements are not altogether satisfactory, because in the case of the screw, the attendant may overlook making the necessary adjustment, whereas with the piston arrangement, the spring is apt to break, in either case, failing to provide the necessary lubrication to the contact surface of the plug.

The primary object of the present invention is to provide a plug valve having an improved lubricating system.

Another object is to provide a plug lubricating system of the type which employs an oil reservoir under pressure, but having an improved mechanism for applying the pressure.

A further object is to provide a plug lubricating system which requires no manual adjustment of the pressure on the lubricant and no springs, yet complete control of this pressure can be exercised from any desired point.

Another object is to provide a plug valve lubricating system of the lubricating reservoir type in which the pressure on the lubricant can be maintained continuously and increased from time to time, or can be applied only intermittently as circumstances require.

A still further object is to provide a plug valve lubricating system in which the pressure of the lubricant furnished the plug is controlled at a position remote from the valve.

Another object is to provide a plug valve lubricating system of the type in which the lubricant is fed to the plug by pressure, the improvement consisting of an electrical device for controlling the on and off application of the pressure, and the amount of pressure.

The invention will be better understood when reference is made to the following description and the accompanying drawings in which:

Figure 1 is a perspective view of a typical form of plug valve but to which the invention has been applied;

Figure 2 represents an electrical system which may be used in the control of the pressure applied to the lubricant in the valve shown in Figure 1; and Figure 3 illustrates a detailed showing in elevation, but partly in section, of the thermo-expansive element connected to the set screw in the stem to form a unit and showing the manner in which this mechanical connection can be typically made.

Referring to Fig. 1, reference character 1 represents the end flange portions of a coupling or valve body 2. The flanges are provided with holes 3 for connection with adjacent flanges of conduits in which the valve is inserted for controlling the flow of fluid therethrough. The valve body and the flange portions have a relatively large opening 4 therethrough, this opening being in alignment with the openings in the adjacent pipe system. There is a plug 5 of a general conical shape extending preferably vertically downward and seated in an opening 6 of corresponding shape to a snug but slidable fit. The plug 5 has a transverse opening 7 which, when the plug is in a predetermined position, i. e. valve open condition, this opening is in line with the openings 4 of the valve body.

The plug is adapted to be rotated or moved from valve open to valve closed condition and is supported on a ball bearing 8 at the center, this bearing fitting into a conically shaped recess 9 in the plug and a cylindrical recess 10 in the valve casing or body. A cap screw 11 is threadedly received by an opening at the bottom of the body to press against the ball bearing and thereby hold the plug in its proper vertical position. It will be noted that there is a space 12 between the lower end of the plug and the flat bottom surface of the conical opening in the valve body, this space serving for the collection of used lubricant as will be explained hereinafter.

The plug terminates at the top in a stem 13 of any desired peripheral shape to facilitate the rotation of the plug from valve open to valve closed position. A plate 14 is secured by the cap bolts 15 to the valve body, this plate being provided with an opening 16 which slidably receives the stem 13 of the plug. On the underneath surface of the plate 14 and surrounding the opening 16 there is a circular recess 17 having an outer diameter of approximately the same size as the upper edge of the plug to leave a space for a bearing washer 18.

It will be understood that plug valves of this general character are often used for controlling the flow of corrosive fluid or fluids containing precipitates which tend to rust or otherwise to clog against the contiguous bearing surfaces between the plug and the valve body, rendering the plug very difficult to turn. Sometimes the plug is left for considerable periods of time in one position, open or closed, and there is a tendency to cause the valve to seize within its opening. In order to protect the bearing surfaces between the plug and the valve body, a system of lubrication is employed, which in so far as the plug surface is concerned, may be considered typical. This system employs a circumferential groove 19 near the top of the plug and a series of longitudinal grooves 20 extend longitudinally of the plug and interconnected together through the groove 19. The position of these longitudinal grooves is usually arranged such that when the plug is turned between its on and off positions, no part of these lubricating grooves will pass the opening 4, which might otherwise deprive the groove of any lubricant contained therein.

In order to supply the passageways 19, 20 with lubricant, a lubricant reservoir 21 is provided, this reservoir being formed out of an opening 22 which extends centrally of the stem 13 and into the plug proper as far as the circumferential groove 19. The lubricant is introduced into the reservoir 21, either in stick or liquid form, and the central opening 22 can be closed by a set screw 23.

The main problem in plug valves of this character is to provide a suitable structure or arrangement for applying pressure to the lubricant in the reservoir in order to force this lubricant to flow through the narrow grooves 19, 20, thereby to keep the contiguous bearing surfaces adequately lubricated.

In accordance with one of the features of my invention, I provide a thermo-expansive element 24 for this purpose, this element being contained between the lower end of the set screw 23 and the upper surface of the lubricant which is normally introduced in fairly solid stick form. This element may comprise any material that has a large co-efficient of expansion when subjected to heat and one that is not susceptible to the corrosive effect of liquids being controlled by the valve and passing through the opening 4.

While certain thermo-plastics such as cellulose acetate or nitrate, ethyl cellulose, vinylidene chloride, and thermo-setting resins such as phenol furfurals and urea formaldehyde can be used for this purpose, I prefer to employ the thermoplastic resin polyethylene on account of its extremely large thermal expansion. This plastic has an expansion of .00150 in./in./° C. The thermo-plastic or thermo-setting resin is formed in a round rod of slightly less diameter than the opening 22. In order to heat this rod in order to cause the necessary expansion, as will be explained hereinafter, any source of heat such as a blow torch could be applied to the stem 13. But for convenience and nicety of control and also for remoteness of control, when desired, I prefer to employ an electrical means for introducing heat into the rod. As shown, coils of wire 25 are distributed through the rod, these coils being connected together either in series or parallel and taken out through insulated openings 26 in the set screw 23 to leads 27. It is apparent that the coils 24 can be imbedded within the plastic material during the molding operation, these coils preferably being bare when they are thus imbedded, but suitably insulated where the wires pass up through the set screw. The plastic serves as a good insulator between the coils and the bareness of the wires provides maximum heat radiation from the heater.

It is preferred that the thermo-expansive element 24 be secured to the set screw 23 so that the two elements constitute a single unit and within Fig. 3 and can be inserted as a unit and withdrawn in like manner from the opening. Any suitable means can be employed to secure the screw and the plastic element 24 together, but as shown in Fig. 3, the screw is provided with an opening 28 at its lower end into which is pressed a tip 29 of the element 24. This tip can be threaded, if desired, into the opening.

The reservoir 21 preferably contains grease in stick rather than liquid form, and obviously as the ends 27 are connected with a suitable source of alternating or direct current, the heat radiated by the coils 24 will cause expansion in the diametral direction, but considerably more expansion in the longitudinal direction in order to apply pressure to the grease stick and to force the lubricant through the passageways 19 and 20 and thereby lubricate the bearing surfaces between the plug and the valve body. A washer 27' of metal and having a size as barely slidably to fit the opening 22 may be interposed between plastic member 24 and the upper surface of the grease stick in order to prevent grease from working up into the space between the circumferential surface of the member and the opening 22. In order to facilitate the lubrication of the plug, it may be desirable to initially apply lubricant in liquid or grease form to these passageways of the plug when the valve is being assembled and rely on the grease from the stick to replenish any lubricant that is used up during the operation of the valve.

When it become necessary to replace the plastic element 24 to accommodate either a longer or shorter stick of grease, it is simply necessary to unscrew the set screw and its attached plastic element 24 so that the unit as a whole can be replaced by another unit of the desired length or having the proper coil characteristics. However, it will be understood that adjustments to accommodate some of the losses of the grease in the reservoir can be made at the set-screw.

The electrical means for heating the thermo-expansive unit 24 lends itself to remote control and in Fig. 2 there is indicated by the rectangles 30 a number of valves which may be scattered over considerable distances, as for example, over an oil field, and each one of which is provided with a thermo-expansive element for applying pressure to a stick of grease or a quantity of lubricant in order to lubricate the plug valve.

The coils contained in each of these units are indicated at 25 and the leads 27 may be connected through a circuit 31 to individual push buttons 32. The return wire from these push button switches may be connected together as indicated at 33 and contain a battery 34. These push buttons or any other suitable type of electrical switch may be located, for example, in a control room remote from the valves, this remoteness or separation of position being indicated by the dot-dash line 35. Thus when any one of the switches 32 is operated, the particular valve containing the electrical heater which is responsive to that switch is given a shot of lubricant from the grease stick contained in the stem and these switches may be operated either intermittently on an automatic time schedule or operated by hand.

The longer the switch is closed, the greater is the amount of lubricant that is forced into the passageways. As the stick of grease becomes shortened, after repeated and more sustained heating, the set screw 23 can be screwed further down into the stem so as to bring the plastic element 24 in closer contact with the grease and thus require less heating. However, eventually the stick of grease becomes so short that it is more practical to either insert a new stick of grease or else unscrew the combined set screw-element 24 and replace the same by a longer element. It is unnecessary that the attendant inspect each and every valve to determine whether additional lubricant is needed, since the entire lubricating system, when once the thermo-expansive unit has been installed, is controlled from a single location and, if desired, on a prescribed time schedule.

Any excess or used lubricant flows down through the vertical passageways 20 and collects in the space 12 where it can be removed from time to time by unscrewing the cap screw 11.

While I prefer to use plastic material as part of an electrical device remotely controlled for applying pressure to the lubricant in a plug valve, it is apparent that other electrically or heat operated devices can be employed for the purpose of producing the necessary thermo-expansion. For example, a bi-metallic strip could be used, together with a suitably positioned electrical coil heater, which when energized causes the strip to deflect downwardly and apply pressure to the stick lubricant 21. Helical springs that are normally used in thermometers and which elongate upon being heated, preferably by an electric heater, could also be used for this purpose. But the plastic material offers advantages over these various alternative devices in that it can be cast into a solid, relatively hard mass and can completely contain the heater, which in the case of an electric coil, can be constituted of bare wire since the plastic furnishes its own insulation.

It will be understood that various modifications and arrangements in structure could be made without departing from the spirit of my invention and, accordingly, I desire to comprehend such modifications and substitutions of equivalents as may be considered to come within the scope of the appended claims.

Having thus fully described my invention, what I claim as new and desire to secure by Letters Patent, is:

1. In a valve having a valve body and a valve member movable therein for controlling the flow of fluid therethrough with lubricating passageways extending over the contiguous surfaces of the valve including a reservoir containing a lubricant, the combination of an element for applying pressure to the lubricant in said reservoir and constituted of a body of plastic material confined in a portion of the reservoir together with a heating coil in said body and a source of electrical energy connected to the coil.

2. In a lubricated plug valve having a valve body and a valve plug rotatable therein for controlling the flow of fluid therethrough with lubricating passageways extending over the contiguous surfaces of the valve, the combination of a body of plastic material in a compartment, said compartment containing a lubricant adjacent said plastic material and communicating with said passageways, together with means for heating said body to cause expansion thereof and to apply pressure against the lubricant.

3. In a lubricated plug valve having a valve body and a valve plug rotatable therein for controlling the flow of fluid therethrough with lubricating passageways extending over the contiguous surfaces of the valve, the combination of a body of plastic material in a compartment, said compartment containing a lubricant adjacent said plastic material and communicating with said passageways, and abutting the lubricant, together with a heating coil imbedded in said body of plastic material and connected to a source of electrical energy.

4. In a valve having a valve body and a valve member movable therein for controlling the flow of fluid therethrough, a compartment formed within said valve member, passageways extending over the contiguous surfaces of the valve and communicating with said compartment, lubricant within said compartment and passageways, a device within said compartment for applying pressure to the lubricant therein, said device comprising at least two elements, one of which contains the other, one of said elements having a relatively high coefficient of expansion and positioned within said compartment adjacent the lubricant to exert pressure against the lubricant in said passageways when the last mentioned element is heated, the other of said elements being constituted of a heating member.

5. In a valve having a valve body and a valve member movable therein for controlling the flow of fluid therethrough, a compartment formed within said valve member, passageways extending over the contiguous surfaces of the valve and communicating with said compartment, lubricant within said compartment and passageways, a device within said compartment for applying pressure to the lubricant therein, said device comprising at least two elements, one of which has a relatively high coefficient of expansion and positioned within said compartment adjacent the lubricant to exert pressure against the lubricant in said passageways when the last mentioned element is heated, and the other of said elements being constituted of a heating member, said heating member being contained within the other element.

6. In a valve having a valve body and a valve member movable therein for controlling the flow of fluid therethrough, a compartment formed within said valve member, passageways extending over the contiguous surfaces of the valve and communicating with said compartment, lubricant within said compartment and passageways, a device within said compartment for applying pressure to the lubricant therein, said device comprising at least two elements, one of which has a relatively high coefficient of expansion and positioned within said compartment adjacent the lubricant to exert pressure against the lubricant in said passageways when the last mentioned element is heated, the other of said elements being constituted of a heating member formed of an electric wire and contained within the other element.

References Cited in the file of this patent

UNITED STATES PATENTS

| Number | Name | Date |
|---|---|---|
| 1,745,934 | Kauch et al. | Feb. 4, 1930 |
| 1,890,909 | Lincoln | Dec. 13, 1932 |
| 2,066,345 | Greby | Jan. 5, 1937 |
| 2,501,946 | Jacobsen | Mar. 28, 1950 |
| 2,585,818 | Moravec | Feb. 12, 1952 |

FOREIGN PATENTS

| Number | Country | Date |
|---|---|---|
| 796,138 | France | Mar. 30, 1936 |